(12) United States Patent
Rich

(10) Patent No.: US 10,555,516 B2
(45) Date of Patent: Feb. 11, 2020

(54) BAIT CUTTING AND CRAB MEASURING APPARATUS

(71) Applicant: Stephen Loyd Rich, Springfield, OR (US)

(72) Inventor: Stephen Loyd Rich, Springfield, OR (US)

(*) Notice: Subject to any disclaimer, the term of this patent is extended or adjusted under 35 U.S.C. 154(b) by 368 days.

(21) Appl. No.: 15/672,181

(22) Filed: Aug. 8, 2017

(65) Prior Publication Data

US 2018/0035656 A1 Feb. 8, 2018

Related U.S. Application Data

(60) Provisional application No. 62/372,082, filed on Aug. 8, 2016.

(51) Int. Cl.
| | |
|---|---|
| *G01B 5/00* | (2006.01) |
| *A01K 97/04* | (2006.01) |
| *A01K 61/59* | (2017.01) |
| *G01B 3/02* | (2020.01) |
| *A01K 99/00* | (2006.01) |

(52) U.S. Cl.
CPC ............ *A01K 97/045* (2013.01); *A01K 61/59* (2017.01); *A01K 99/00* (2013.01); *G01B 3/02* (2013.01)

(58) Field of Classification Search
CPC .................................................... A45K 97/045
USPC ........................................................... 33/511
See application file for complete search history.

(56) References Cited

U.S. PATENT DOCUMENTS

| | | | | | |
|---|---|---|---|---|---|
| 2,559,434 | A | * | 7/1951 | Hyland | A01K 97/045 33/549 |
| 4,972,602 | A | * | 11/1990 | Howes | G01B 3/166 294/3 |
| 5,970,620 | A | * | 10/1999 | Campbell | G01B 3/30 33/485 |
| 6,594,939 | B2 | * | 7/2003 | Ondusko | A01K 97/00 33/464 |
| 7,173,197 | B1 | * | 2/2007 | Kasperek | A01K 97/00 177/131 |
| 7,665,220 | B1 | * | 2/2010 | Gee | A01K 97/00 33/485 |
| 2006/0005460 | A1 | * | 1/2006 | Bittrick | A01K 97/00 43/43.4 |

* cited by examiner

*Primary Examiner* — George B Bennett

(57) ABSTRACT

A bait cutting and crab measuring apparatus that combines a bait cutting device with a crab measuring device. The apparatus includes a bait-cutting channel and a crab-measuring panel. The bait-cutting channel includes first wall, a second wall, a base panel, a first plurality of segment cuts, and a second plurality of segment cuts. The crab-measuring panel can be used to visually and standardly measure various types and sizes of crabs. The first wall and the second wall can be used as a protective handle from the claws of crabs when measuring a crab with the crab-measuring panel. The base panel provides a platform for the bait that is placed inside the bait-cutting channel. The first plurality of segment cuts and the second plurality of segment cuts allow the user to cut the bait inside the bait cutting channel at an angle allowing the bait to spin when on a hook.

20 Claims, 6 Drawing Sheets

BAIT CUTTING AND CRAB MEASURING APPARATUS

The current application claims a priority to the U.S. Provisional Patent application Ser. No. 62/372,082 filed on Aug. 8, 2016.

FIELD OF THE INVENTION

The present invention relates generally to fishing devices. More particularly, the present invention is a bait cutting and crab measuring apparatus which combines a crab measuring device with a bait cutting device. The present invention includes a first and a second wall which may be used as handles to protect the user's hands from crab claws when measuring a crab.

BACKGROUND OF THE INVENTION

Fishing is an industry and a hobby enjoyed by people throughout the world. Professionals and amateurs alike can enjoy the calm challenge of attracting salmon, trout, bass, and more to a lure and reeling it in with the proper strategy. Similarly, crabbing presents a unique set of challenges that appeals to many fishing enthusiasts. Many fishermen will load their vessel with equipment for crab fishing and salmon fishing before departing for the open water. Such equipment includes, among many other pieces of equipment, crab measuring devices and various bait cutters.

Unfortunately, many crab measurers fall short of providing the best help for the user. Most crab measurers have a single flat area, which means that the user's fingers are exposed to the crab claws when the user grips the crab claw measuring device. Further, such crab measuring devices often lack an intuitive handle portion that facilitates handling. In addition, there is a distinct lack of an item that can be used for both cutting bait and for measuring the size of crabs. What is needed is an item that can be used to cut fishing bait and to measure crab size safely.

The present invention addresses these issues. The bait cutting and crab measuring apparatus combines the features of a crab measuring device with those of a bait cutter, allowing for convenient access to both of these objects in one tool. The present invention has markings that allow a user to identify the size of a crab placed in the appropriate area of the present invention. The handle location on the back of the present invention ensures that a user's hands are always protected as the user has the ability to hold the present invention from the side opposite the crab's claws. The present invention also has guiding segments that allow a user to cut a fish in the proper fashion to use as bait.

DETAIL DESCRIPTIONS OF THE INVENTION

All illustrations of the drawings are for the purpose of describing selected versions of the present invention and are not intended to limit the scope of the present invention.

Figure 1:
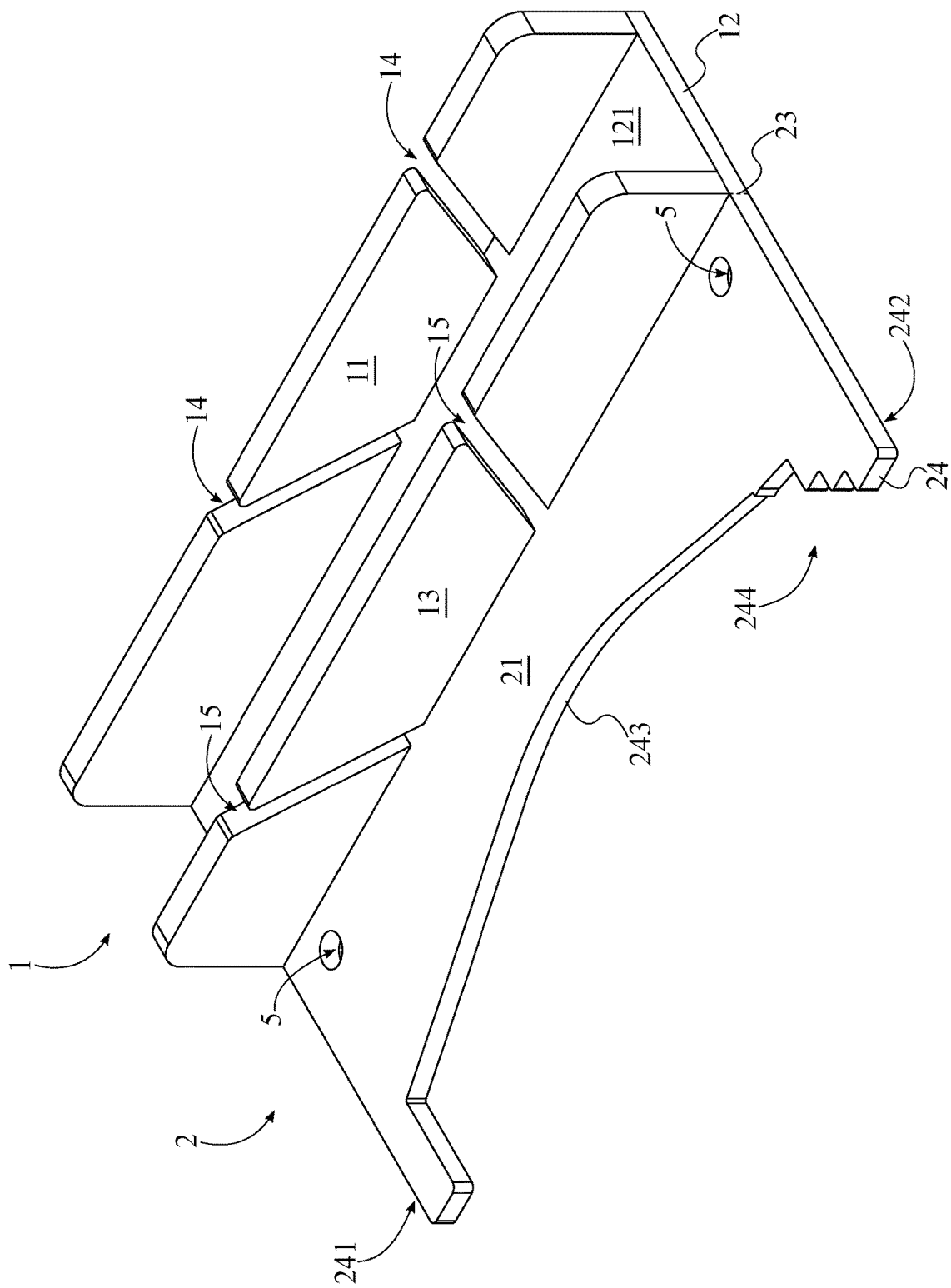
FIG. 1 is a perspective view of the present invention.

In reference to FIGS. 1 through 6, the present invention is a bait cutting and crab measuring apparatus that is used for cutting bait and for the measuring of crabs. The present invention combines a bait cutting device with a crab measuring device allowing a user to accomplish two different tasks with one apparatus. With reference to FIG. 1, the present invention comprises a bait-cutting channel 1 and a crab-measuring panel 2. The bait-cutting channel 1 allows the present invention to receive a chunk of bait and for the user to cut the bait into angled portions. The bait-cutting channel 1 comprises a first wall 11, a second wall 13, a base panel 12, a first plurality of segment cuts 14, and a second plurality of segment cuts 15. The first wall 11 and the second wall 13 serve as boundaries when the bait is placed inside the bait-cutting channel 1. The first wall 11 and the second wall 13 also serve as protective handles protecting the user's hands from the claws of crabs when a user is measuring a crab. The base panel 12 serves as a platform to hold the bait placed inside the bait-cutting channel 1. The first plurality of segment cuts 14 and the second plurality of segment cuts 15 allow the user to place a knife inside the bait-cutting channel 1 to cut the bait placed on the base panel. The crab-measuring panel 2 serves as a crab measuring device allowing the user to visually measure the width of a crab. The crab-measuring panel 1 comprises a third face 21, a fourth face 22, a proximal edge 23, and distal edge 24. The third face 21, the fourth face 22, the proximal edge 23, and the distal edge 24 are reference points for the crab-measuring panel 2.

Figure 2:
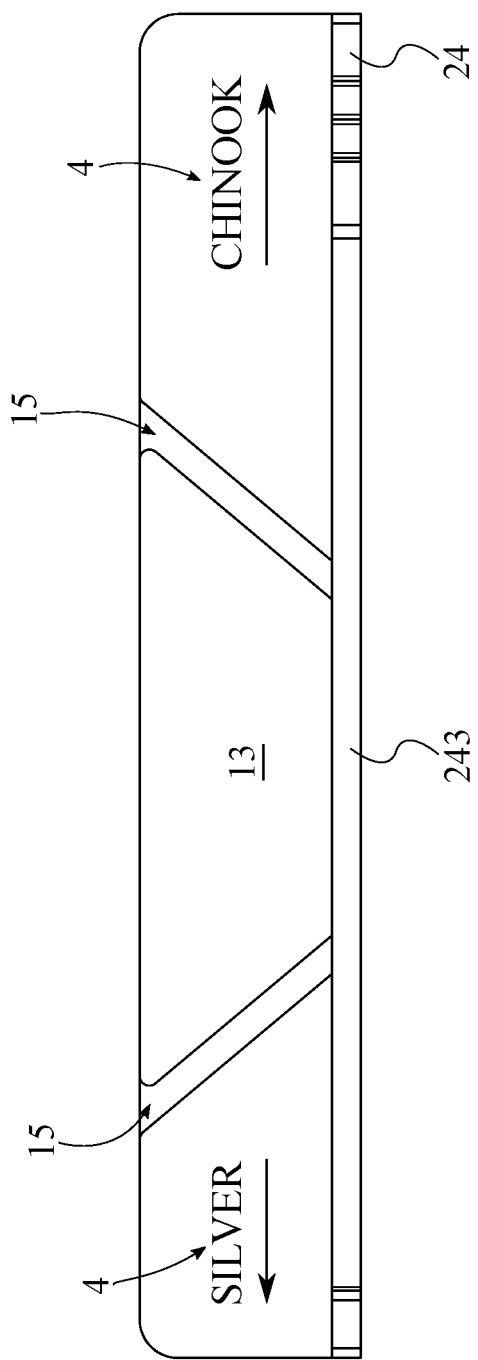
FIG. 2 is a front view of the present invention.
Figure 3:
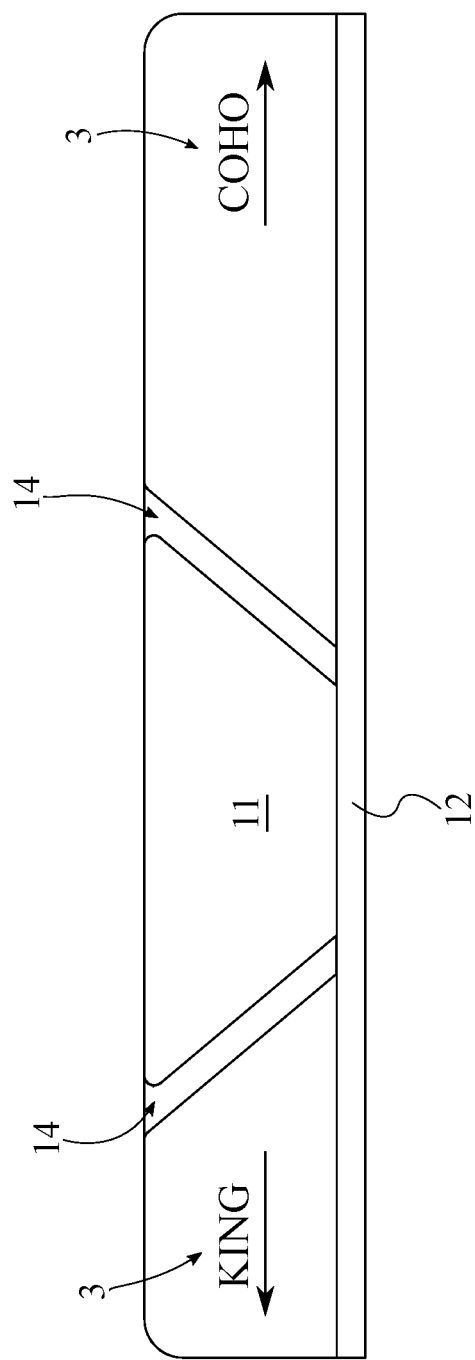
FIG. 3 is a rear view of the present invention.
Figure 4:
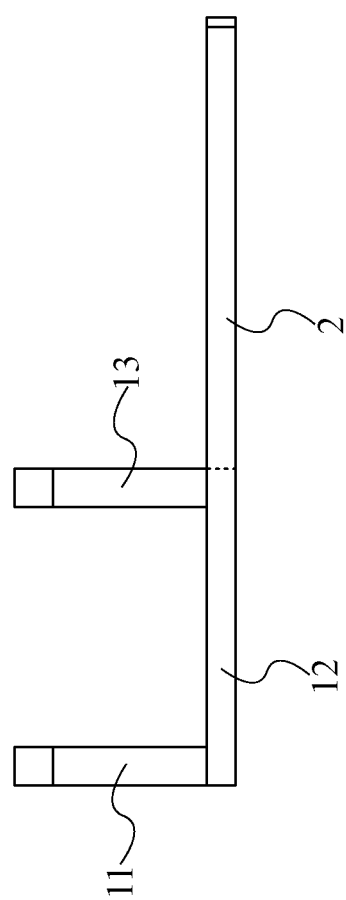
FIG. 4 is a side view of the present invention.

The general configuration of the aforementioned components allows the present invention to efficiently and effectively cut bait and measure crabs. The base panel 12 comprises a first face 121 and a second face 122. With reference to FIGS. 2, 3, and 4, the first wall 11 and the second wall 13 is connected perpendicular to the first face 121 and are positioned opposite to each other across the first face 121. This arrangement between the first wall 11, the second wall 13, and the base panel 12 forms the channel shape for the bait-cutting channel 1. The first wall 11 and the second wall 13 are offset to each other providing enough space for the bait-cutting channel 1 to receive the bait. The first plurality of segment cuts 14 traverses through the first wall 11, towards the base panel 12 and is distributed along the first wall 11. Similarly, the positioning of the first plurality of segment cuts 14 allows a user to traverse a knife through the bait and towards the base panel. The second plurality of segment cuts 15 traverses through the second wall 13, towards the base panel 12 and is distributed along the second wall 13. Similarly, the positioning of the second plurality of segment cuts 15 allows the user to traverse a knife through the bait and towards the base panel 12. The first plurality of segment cuts 14 and the second plurality of segment cuts 15 are not aligned to each other allowing the user to cut the bait in a distinct manner. This distinct manner allows the bait to be cut at an angle, for example, into plug cut bait such as a plug herring bait allowing the bait to be able to spin when on a hook. The proximal edge 23 is connected adjacent to the base panel 12. The crab-measuring panel 2 is positioned coplanar to the base panel 12. The positioning of the crab-measuring panel 2 with respect to the base panel 12 allows the user to grasp the bait-cutting channel 1 as a protective handle when measuring a crab with the crab-measuring panel 2.

Figure 5:
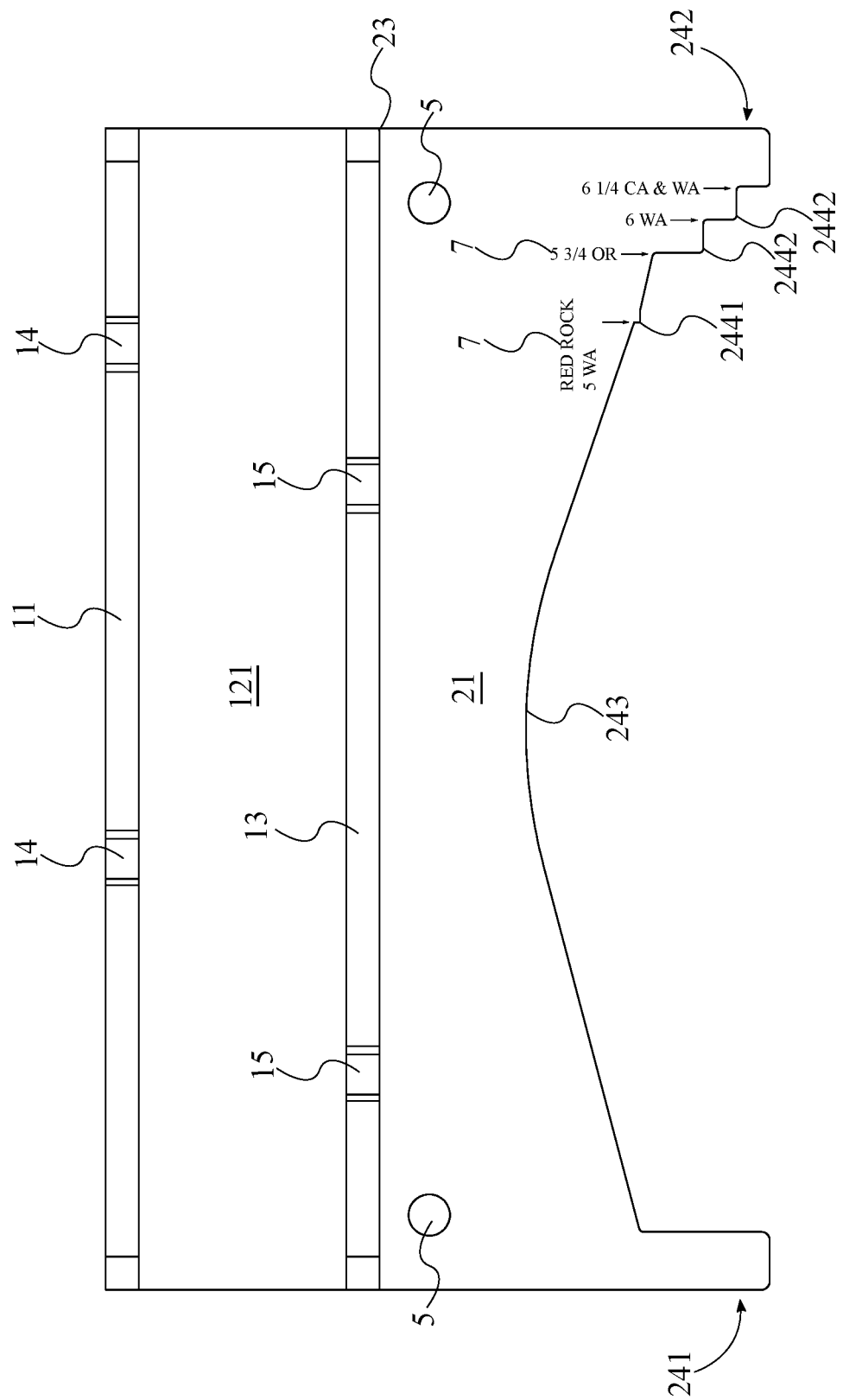
FIG. 5 is a top view of the present invention.

The crab-measuring panel 2 is specifically configured at the distal edge 24 to measure a crab. With reference to FIG. 5, the distal edge 24 comprises a first end 241, a second end 242, a concave portion 243, and a plurality of crab-distinguishing tabs 244. The first end 241 and the second end 242 are positioned opposite to each other along the distal edge 24. The concave portion 243 is positioned between the first end 241 and the second end 242. The concave portion 243 forms a shape along the distal edge 24 to receive a crab. The plurality of crab-distinguishing tabs 244 is integrated into the concave portion 243, offset from the first end 241. The plurality of crab-distinguishing tabs 244 allows the user to distinguish a crab, from various types of crabs, when measuring a crab with the crab-measuring panel 2. The plurality of crab-distinguishing tabs 244 provides distinguishing tabs for various types of crabs. The plurality of crab-distinguishing tabs 244 comprises a primary tab 2441 and a plurality of secondary tabs 2442. The primary tab 2441 is positioned offset from the second end 242. The primary tab 2441 distinguishes a red rock Washington crab. The plurality of secondary tabs 2442 is positioned adjacent to the second end 242. The plurality of secondary tabs 2442 is serially positioned along the concave portion 243. The plurality of secondary tabs 2442 distinguishes various types of crabs larger than the red rock Washington crab. The area between the secondary tab 2442 adjacent to concave portion 243 and the concave portion 243 is shaped to receive an Oregon crab.

With reference to FIGS. 2 and 3, the present invention further comprises a first plurality of cut-identifying markings 3 and a second plurality of cut-identifying markings 4. Each of the first plurality of cut-identifying markings 3 is positioned adjacent to a corresponding cut from the first plurality of segment cuts 14. Each of the first plurality of cut-identifying markings 3 is inscribed into the first wall 11. The first plurality of cut-identifying markings 3 identifies distinct cuts the user can make for the bait through the segment cuts when traversing a knife from the first wall 11 towards the second wall 13. The distinct cuts, for example, are a KING style cut or a COHO style cut. The first plurality of cut-identifying markings 3 is oriented away from the second wall 13 allowing the user to clearly read the first plurality of cut-identifying markings 3. Likewise, each of the second plurality of cut-identifying markings 4 is positioned adjacent to a corresponding cut from the second plurality of segment cuts 15. Each of the second plurality of cut-identifying markings 4 is inscribed into the second wall 13. The second plurality of cut-identifying markings 4 identifies distinct cuts the user can make for the bait through the segment cuts when traversing a knife from the second wall 13 towards the first wall 11. The distinct cuts, for example, are a SILVER style cut or a CHINOOK style cut. The second plurality of cut-identifying markings 4 is oriented away from the first wall 11 allowing the user to clearly read the second plurality of cut-identifying markings 4.

Figure 6:
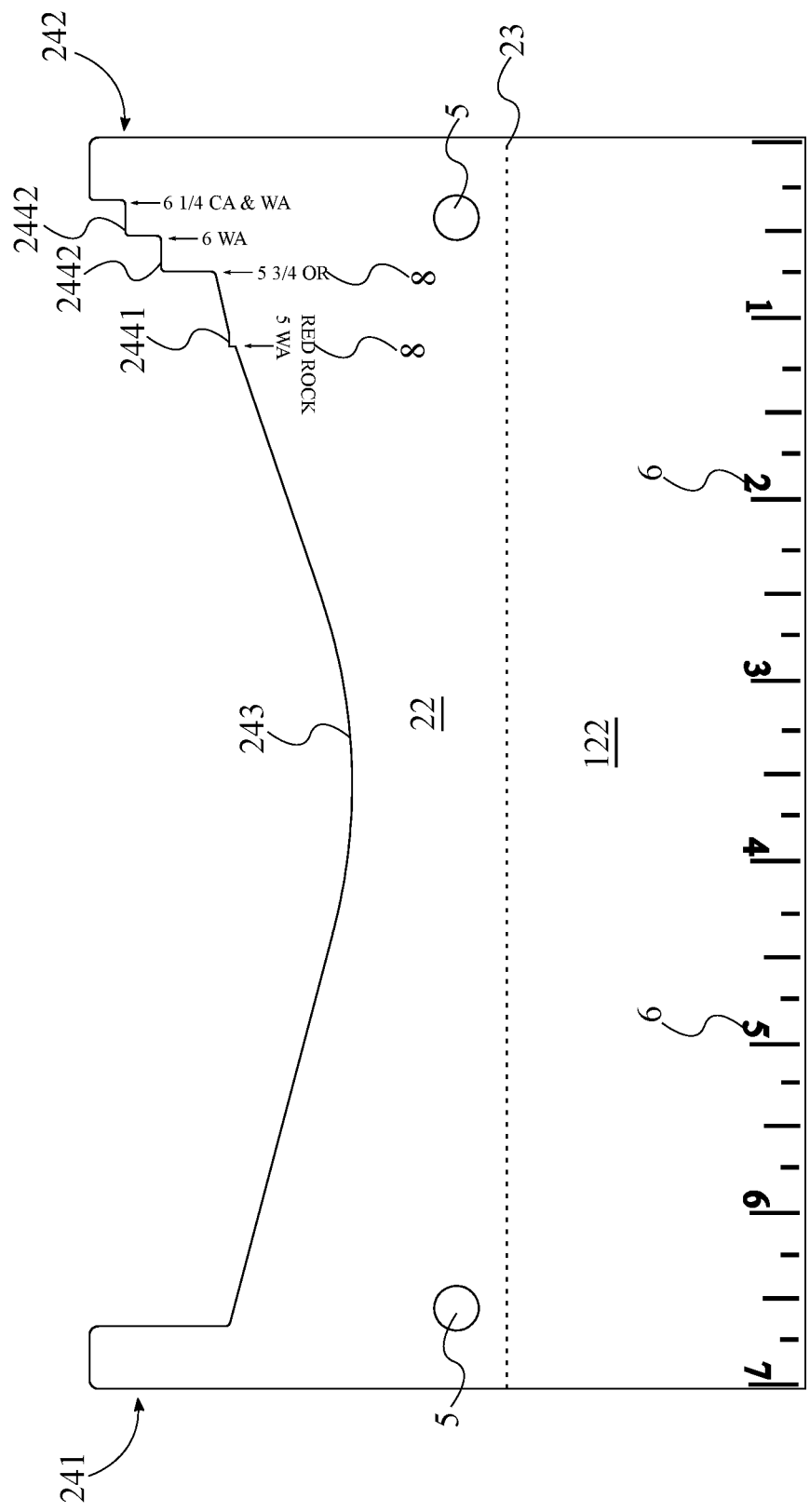
FIG. 6 is a bottom view of the present invention.

With reference to FIGS. 5 and 6, the present invention further comprises a plurality of length-measuring markings 6 and a plurality of openings 5. The plurality of length-measuring markings 6 is inscribed across the second face 122. The plurality of length-measuring markings 6 is positioned adjacent to the first wall 11. The plurality of length-measuring markings 6 allows the user to manually measure a crab using standardized units such as inches or centimeters. The plurality of openings 5 traverses through the crab-measuring panel 2. The plurality of openings 5 is positioned between the proximal edge 23 and the distal edge 24. The plurality of openings 5 is positioned offset from each other. The plurality of openings 5 allows a user to string an item such as a lanyard proving the user a method to carry the present invention with the lanyard or other similar string item. The positioning and number of the openings allow a left-handed or a right-handed user to carry the present invention with a lanyard or similar string item.

With reference to FIGS. 5 and 6, the present invention further comprises a first plurality of crab-identifying markings 7 and a second plurality of crab-identifying markings 8. Each of the first plurality of crab-identifying markings 7 is positioned adjacent to a corresponding tab from the plurality of crab-distinguishing tabs 244. Each of the first plurality of crab-identifying markings 7 is inscribed into the third face 21. Similarly, each of the second plurality of crab-identifying markings 8 is positioned adjacent to a corresponding tab from the plurality of crab-distinguishing tabs 244. Each of the second plurality of crab-identifying markings 8 is inscribed into the fourth face 22. The crab-identifying markings provide markings allowing the user to read the type of crab that is measured using the plurality of crab-distinguishing tabs 244. The crab-identifying markings, for example, provide markings for a 5¾ Oregon crab, a 6 Washington crab, and a 6¼ California and Washington Crab.

Although the invention has been explained in relation to its preferred embodiment, it is to be understood that many other possible modifications and variations can be made without departing from the spirit and scope of the invention as hereinafter claimed.

The invention claimed is:

1. A bait cutting and crab measuring apparatus comprises:
    a bait-cutting channel;
    a crab-measuring panel;
    the bait-cutting channel comprises a first wall, a second wall, a base panel, a first plurality of segment cuts, and a second plurality of segment cuts;
    the crab-measuring panel comprises a third face, a fourth face, a proximal edge, and a distal edge;
    the base panel comprises a first face and a second face;
    the first wall and the second wall being connected perpendicular to the first face;
    the first wall and the second wall being positioned opposite to each other across the first face;
    the first plurality of segment cuts traversing through the first wall, towards the base panel;
    the first plurality of segment cuts being distributed along the first wall;
    the second plurality of segment cuts traversing through the second wall, towards the base panel;
    the second plurality of segment cuts being distributed along the second wall;
    the proximal edge being connected adjacent to the base channel; and
    the crab-measuring panel being positioned coplanar to the base panel.

2. The bait cutting and crab measuring apparatus as claimed in claim 1 comprises:
    the distal edge comprises a first end, a second end, a concave portion, and a plurality of crab-distinguishing tabs;
    the first end and the second end being positioned opposite to each other along the distal edge;
    the concave portion being positioned between the first end and the second end; and
    the plurality of crab-distinguishing tabs being integrated into the concave portion, offset from the first end.

3. The bait cutting and crab measuring apparatus as claimed in claim 2 comprises:
    the plurality of crab-distinguishing tabs comprises a primary tab; and
    the primary tab being positioned offset from the second end.

4. The bait cutting and crab measuring apparatus as claimed in claim 2 comprises:
the plurality of crab-distinguishing tabs comprises a plurality of secondary tabs;
the plurality of secondary tabs being positioned adjacent to the second end; and
the plurality of secondary tabs being serially positioned along the concave portion.

5. The bait cutting and crab measuring apparatus as claimed in claim 2 comprises:
a first plurality of crab-identifying markings;
each of the first plurality of crab-identifying markings being positioned adjacent to a corresponding tab from the crab-distinguishing tabs; and
each of the first plurality of crab-identifying markings being inscribed into the third face.

6. The bait cutting and crab measuring apparatus as claimed in claim 2 comprises:
a second plurality of crab-identifying markings;
each of the second plurality of crab-identifying markings being positioned adjacent to a corresponding tab from the crab-distinguishing tabs; and
each of the second plurality of crab-identifying markings being inscribed into the fourth face.

7. The bait cutting and crab measuring apparatus as claimed in claim 1 comprises:
a first plurality of cut-identifying markings;
each of the first plurality of cut-identifying markings being positioned adjacent to a corresponding cut from the first plurality of segment cuts; and
each of the first plurality of cut-identifying markings being inscribed into the first wall.

8. The bait cutting and crab measuring apparatus as claimed in claim 5 comprises:
the first plurality of cut-identifying markings being oriented away from the second wall.

9. The bait cutting and crab measuring apparatus as claimed in claim 1 comprises:
a second plurality of cut-identifying markings;
each of the second plurality of cut-identifying markings being positioned adjacent to a corresponding cut from the second plurality of segment cuts; and
each of the second plurality of cut-identifying markings being inscribed into the second wall.

10. The bait cutting and crab measuring apparatus as claimed in claim 7 comprises:
the second plurality of cut-identifying markings being oriented away from the first wall.

11. The bait cutting and crab measuring apparatus as claimed in claim 1 comprises:
a plurality of length-measuring markings;
the plurality of length-measuring markings being inscribed across the second face; and
the plurality of length-measuring markings being positioned adjacent to the first wall.

12. The bait cutting and crab measuring apparatus as claimed in claim 1 comprises:
a plurality of openings;
the plurality of openings traversing through the crab-measuring panel;
the plurality of openings being positioned between the proximal edge and the distal edge; and
the plurality of openings being positioned offset from each other.

13. A bait cutting and crab measuring apparatus comprises:
a bait-cutting channel;
a crab-measuring panel;
the bait-cutting channel comprises a first wall, a second wall, a base panel, a first plurality of segment cuts, and a second plurality of segment cuts;
the crab-measuring panel comprises a third face, a fourth face, a proximal edge, and a distal edge;
the distal edge comprises a first end, a second end, a concave portion, and a plurality of crab-distinguishing tabs;
the base panel comprises a first face and a second face;
the first wall and the second wall being connected perpendicular to the first face;
the first wall and the second wall being positioned opposite to each other across the first face;
the first plurality of segment cuts traversing through the first wall, towards the base panel;
the first plurality of segment cuts being distributed along the first wall;
the second plurality of segment cuts traversing through the second wall, towards the base panel;
the second plurality of segment cuts being distributed along the second wall;
the proximal edge being connected adjacent to the base channel;
the crab-measuring panel being positioned coplanar to the base panel;
the first end and the second end being positioned opposite to each other along the distal edge;
the concave portion being positioned between the first end and the second end; and
the plurality of crab-distinguishing tabs being integrated into the concave portion, offset from the first end.

14. The bait cutting and crab measuring apparatus as claimed in claim 13 comprises:
the plurality of crab-distinguishing tabs comprises a primary tab and a plurality of secondary tabs;
the primary tab being positioned offset from the second end;
a plurality of secondary tabs;
the plurality of secondary tabs being positioned adjacent to the second end; and
the plurality of secondary tabs being serially positioned along the concave portion.

15. The bait cutting and crab measuring apparatus as claimed in claim 13 comprises:
a first plurality of crab-identifying markings;
each of the first plurality of crab-identifying markings being positioned adjacent to a corresponding tab from the crab-distinguishing tabs; and
each of the first plurality of crab-identifying markings being inscribed into the third face.

16. The bait cutting and crab measuring apparatus as claimed in claim 13 comprises:
a second plurality of crab-identifying markings;
each of the second plurality of crab-identifying markings being positioned adjacent to a corresponding tab from the crab-distinguishing tabs; and
each of the second plurality of crab-identifying markings being inscribed into the fourth face.

17. The bait cutting and crab measuring apparatus as claimed in claim 13 comprises:
a first plurality of cut-identifying markings;
each of the first plurality of cut-identifying markings being positioned adjacent to a corresponding cut from the first plurality of segment cuts;
each of the first plurality of cut-identifying markings being inscribed into the first wall; and the first plurality of cut-identifying markings being oriented away from the second wall.

18. The bait cutting and crab measuring apparatus as claimed in claim 13 comprises:
   a second plurality of cut-identifying markings;
   each of the second plurality of cut-identifying markings being positioned adjacent to a corresponding cut from the second plurality of segment cuts;
   each of the second plurality of cut-identifying markings being inscribed into the second wall; and
   the second plurality of cut-identifying markings being oriented away from the first wall.

19. The bait cutting and crab measuring apparatus as claimed in claim 13 comprises:
   a plurality of length-measuring markings;
   the plurality of length-measuring markings being inscribed across the second face; and
   the plurality of length-measuring markings being positioned adjacent to the first wall.

20. The bait cutting and crab measuring apparatus as claimed in claim 13 comprises:
   a plurality of openings;
   the plurality of openings traversing through the crab-measuring panel;
   the plurality of openings being positioned between the proximal edge and the distal edge; and
   the plurality of openings being positioned offset from each other.

\* \* \* \* \*